(12) United States Patent
Chuang

(10) Patent No.: US 10,308,303 B2
(45) Date of Patent: Jun. 4, 2019

(54) BICYCLE SEAT FOR ACCOMMODATING BICYCLE ACCESSORIES

(71) Applicant: Louis Chuang, Taichung (TW)

(72) Inventor: Louis Chuang, Taichung (TW)

(*) Notice: Subject to any disclaimer, the term of this patent is extended or adjusted under 35 U.S.C. 154(b) by 70 days.

(21) Appl. No.: 15/623,451

(22) Filed: Jun. 15, 2017

(65) Prior Publication Data

US 2018/0037285 A1    Feb. 8, 2018

(51) Int. Cl.
| | | |
|---|---|---|
| A47C 7/62 | (2006.01) |
| B62J 1/28 | (2006.01) |
| B62J 1/00 | (2006.01) |
| B62J 9/00 | (2006.01) |
| B62J 9/02 | (2006.01) |
| B62J 11/00 | (2006.01) |
| B62J 11/02 | (2006.01) |

(52) U.S. Cl.
CPC . B62J 1/28 (2013.01); B62J 1/00 (2013.01); B62J 9/006 (2013.01); B62J 9/02 (2013.01); B62J 11/00 (2013.01); B62J 11/02 (2013.01)

(58) Field of Classification Search
CPC ......... B62J 1/00; B62J 1/28; B62J 9/02; B62J 11/00; B62J 9/005; B62J 1/007; B62J 1/08; B62J 1/065; B62J 9/00; B62J 9/001
USPC ... 297/188.12, 195.1, 188.1, 188.01, 188.02, 297/188.08, 188.21; 224/427, 448, 453, 224/454, 455
See application file for complete search history.

(56) References Cited

U.S. PATENT DOCUMENTS

| | | | | |
|---|---|---|---|---|
| 5,190,345 A | * | 3/1993 | Lin | B62J 9/006 224/427 |
| 5,496,089 A | * | 3/1996 | Muderlak | B62J 9/006 224/427 |
| 7,264,308 B2 | * | 9/2007 | Bigolin | B62J 9/006 297/188.12 |
| 7,625,041 B2 | * | 12/2009 | Bigolin | B62J 1/08 297/188.08 |
| 8,720,758 B2 | * | 5/2014 | Angeli | B62J 1/28 224/427 |
| 8,720,759 B1 | | 5/2014 | Henderson | |
| 9,096,286 B1 | | 8/2015 | Lin | |
| 2006/0061156 A1 | * | 3/2006 | Bigolin | B62J 9/006 297/195.1 |
| 2007/0138846 A1 | * | 6/2007 | Ritchey | B62J 1/08 297/215.14 |
| 2009/0039127 A1 | | 2/2009 | Dacko | |

(Continued)

FOREIGN PATENT DOCUMENTS

| | | |
|---|---|---|
| DE | 10012888 A1 | 9/2001 |
| EP | 1413504 A1 | 4/2004 |

(Continued)

*Primary Examiner* — Chi Q Nguyen
(74) *Attorney, Agent, or Firm* — Alan D. Kamrath; Mayer & Williams PC

(57) ABSTRACT

A bicycle seat for accommodating bicycle accessories includes a seat having a bottom face. Two rails are fixed below and spaced from the bottom face of the seat. A support is connected to the seat and is located between the two rails. A receiving space is defined between the support and the seat and can accommodate at least one bicycle accessory. The space between the two rails can be effectively used, and the receiving space can accommodate bicycle accessories.

9 Claims, 7 Drawing Sheets

(56) References Cited

U.S. PATENT DOCUMENTS

| | | | |
|---|---|---|---|
| 2010/0264184 A1* | 10/2010 | Retief | B62J 11/00 224/427 |
| 2011/0221245 A1* | 9/2011 | Kim | B62J 1/08 297/215.15 |
| 2014/0263510 A1* | 9/2014 | Ton | B62H 5/001 224/451 |
| 2016/0068212 A1* | 3/2016 | Hamel | B62J 1/007 297/201 |

FOREIGN PATENT DOCUMENTS

| | | |
|---|---|---|
| EP | 2070809 B1 | 1/2011 |
| TW | M367858 U | 11/2009 |
| TW | M372806 U | 1/2010 |
| TW | M402831 U | 5/2011 |
| TW | I476124 B | 3/2015 |

* cited by examiner

BICYCLE SEAT FOR ACCOMMODATING BICYCLE ACCESSORIES

BACKGROUND OF THE INVENTION

The present invention relates to a bicycle seat and, more particularly, to a bicycle seat for accommodating bicycle accessories.

Taiwan Patent No. I476124 discloses a bicycle seat deformable in response to movement of inner sides of thighs of a rider. The bicycle seat includes a seat body having a base, two supporting portions extending from the base in the same direction and spaced from each other, two rear engaging portions mounted to a bottom face of the base, and two front engaging portions mounted to a bottom face of the supporting portion. Each front engaging portion includes a front insertion groove having an opening facing the rear engaging portions and having an outer thread. Each front insertion groove is in the form of a spherical hole. A seat frame is mounted below the seat body and includes two rods, two rear frame portions, and two front frame portions. Each rear frame portion is provided on an end of one of the rods and is coupled to one of the rear engaging portions. Each front frame portion is provided on the other end of one of the rods and is coupled to one of the front insertion grooves. Each front frame portion is in the form of a ball for coupling with the spherical hole. Two threaded members are provided. Each threaded member is threadedly mounted around one of the front insertion grooves and includes a threaded groove having an inner periphery with an inner thread for threading connection with the outer thread of the corresponding front insertion groove. A through-hole is defined in a bottom wall of the threaded groove, is extended by one of the rods, and has a diameter smaller than an outer diameter of a corresponding front frame portion. When the rider sits on the conventional bicycle seat, a bag is required for carrying bicycle accessories, such as a $CO_2$ gas container, an inflation pump, an inner tire, etc. In another approach, a seat bag is disposed to the bicycle seat for receiving the bicycle accessories, which is inconvenient.

Thus, a need exists for a novel bicycle seat that mitigates and/or obviates the above disadvantages.

BRIEF SUMMARY OF THE INVENTION

To fulfill the above need, a bicycle seat for accommodating bicycle accessories includes a seat having a bottom face. Two rails are fixed below and spaced from the bottom face of the seat. A support is connected to the seat and is located between the two rails. A receiving space is defined between the support and the seat and can accommodate at least one bicycle accessory. The space between the two rails can be effectively used, and the receiving space can accommodate bicycle accessories. A user does not have to prepare a seat bag, which is convenient.

In an example, the seat includes a first pivotal portion and a first engaging portion. The first pivotal portion and the first engaging portion are located adjacent to the bottom face. The support includes a second pivotal portion and a second engaging portion. The second pivotal portion is pivotably connected to the first pivotal portion. The second engaging portion is releasably connected to the first engaging portion. The support and the seat together define the receiving space when the second engaging portion is connected to the first engaging portion.

In an example, the seat includes a first face and a second face. The first face and the second face extend perpendicularly to each other and are located between the first pivotal portion and the first engaging portion. The support includes a third face and a fourth face. The third face and the fourth face extend perpendicularly to each other and are located between the second pivotal portion and the second engaging portion. The first face, the second face, the third face, and the fourth face together define a periphery of the receiving space when the second engaging portion is connected to the first engaging portion.

In an example, the first engaging portion includes a screw hole. The second engaging portion includes a through-hole. A bolt extends through the through-hole and is in threading connection with the screw hole.

In an example, the receiving space includes a first opening and a second opening. The first opening and the second opening are respectively located on two opposite sides of the receiving space. A first stopper member is pivotably connected to a side of the seat adjacent to the first opening and is selectively connected to the support to open or close the first opening. A second stopper member is pivotably connected to another side of the seat adjacent to the second opening and is selectively connected to the support to open or close the second opening.

In an example, the seat includes a first groove and a second groove. The first groove and the second groove are located between the first pivotal portion and the first engaging portion. The support includes a third groove and a fourth groove. The third groove and the fourth groove are located between the second pivotal portion and the second engaging portion and are located adjacent to the bottom face. The first stopper member is elastically deformable and includes a first buckle portion and a second buckle portion. The first buckle portion and the second buckle portion are respectively located on two opposite ends of the first stopper member. The first buckle portion is received in the first groove. The second buckle portion is removably received in the third groove. The second stopper member is elastically deformable and includes a third buckle portion and a fourth buckle portion. The third buckle portion and the fourth buckle portion are respectively located on two opposite ends of the second stopper member. The third buckle portion is received in the second groove. The fourth buckle portion is removably received in the fourth groove.

In an example, the seat includes a first body, a second body, and a third body. The first body includes the bottom face, a top face, and a receiving groove. The top face is located on a side of the first body opposite to the first face and is adapted to be sat upon by a user. The receiving groove is defined in the bottom face and is located between the two rails. The second body and the third body are received in the receiving groove. The third body is located between the first body and the second body. The second body includes the first pivotal portion and the first engaging portion. The third body includes the first groove and the second groove. The first groove and the second groove are respectively located on two opposite sides of the second body. The support includes a fourth body and a fifth body. The fourth body includes the second pivotal portion and the second engaging portion. The fifth body is mounted on an end of the fourth body opposite to the seat and includes the third groove and the fourth groove. The third groove and the fourth groove are respectively located on two opposite sides of the fourth body.

In an example, the first body includes at least one screw hole in a bottom wall of the receiving groove. The second body includes at least one through-hole extending through the second body. At least one screw extends through the at least one through-hole and is in threading connection with the at least one screw hole.

In an example, the first body includes a front end and a rear end. The front end and the rear end are respectively located on two opposite ends of the first body. The receiving groove is disposed at an end of the first body adjacent to the rear end. The first pivotal portion of the second body is located adjacent to the rear end of the first body. The first engaging portion of the second body is located between the front end and the rear end.

In an example, the support includes two screw holes and two connecting portions. The two screw holes are located adjacent to an end of the second pivotal portion opposite to the second engaging portion. The two screw holes are configured to couple a water bottle carrier to the support. The two connecting portions are located between the second pivotal portion and the second engaging portion and are located on a side of the support remote to the seat. An inflation gas container is adapted to be connected to one of the two connecting portions. An inflation valve coupler is adapted to be connected to the other of the two connecting portions.

The present invention will become clearer in light of the following detailed description of illustrative embodiments of this invention described in connection with the drawings.

DETAILED DESCRIPTION OF THE INVENTION

Figure 1:
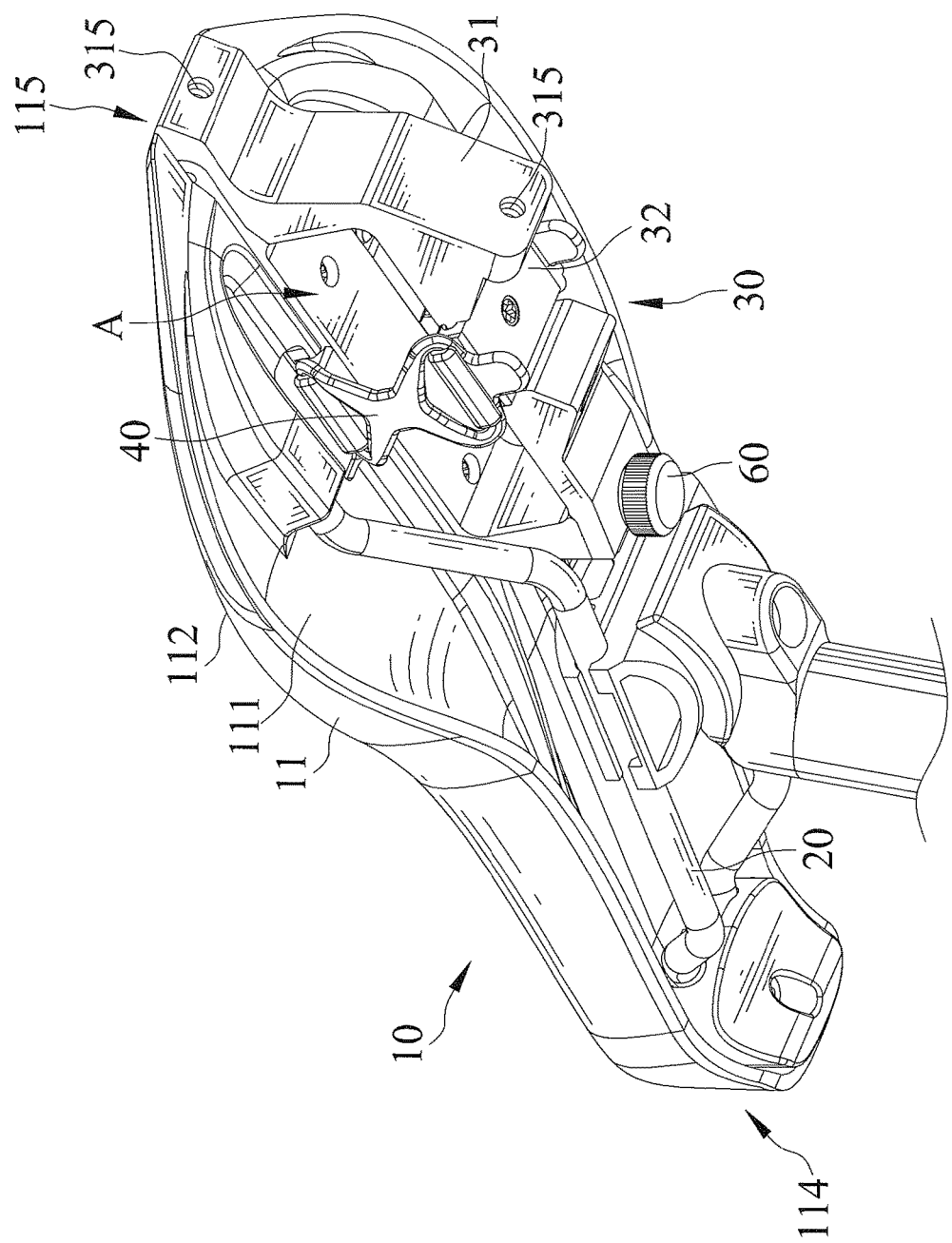
FIG. 1 is a bottom, perspective view of a bicycle seat for accommodating bicycle accessories according to the present invention.
Figure 2:
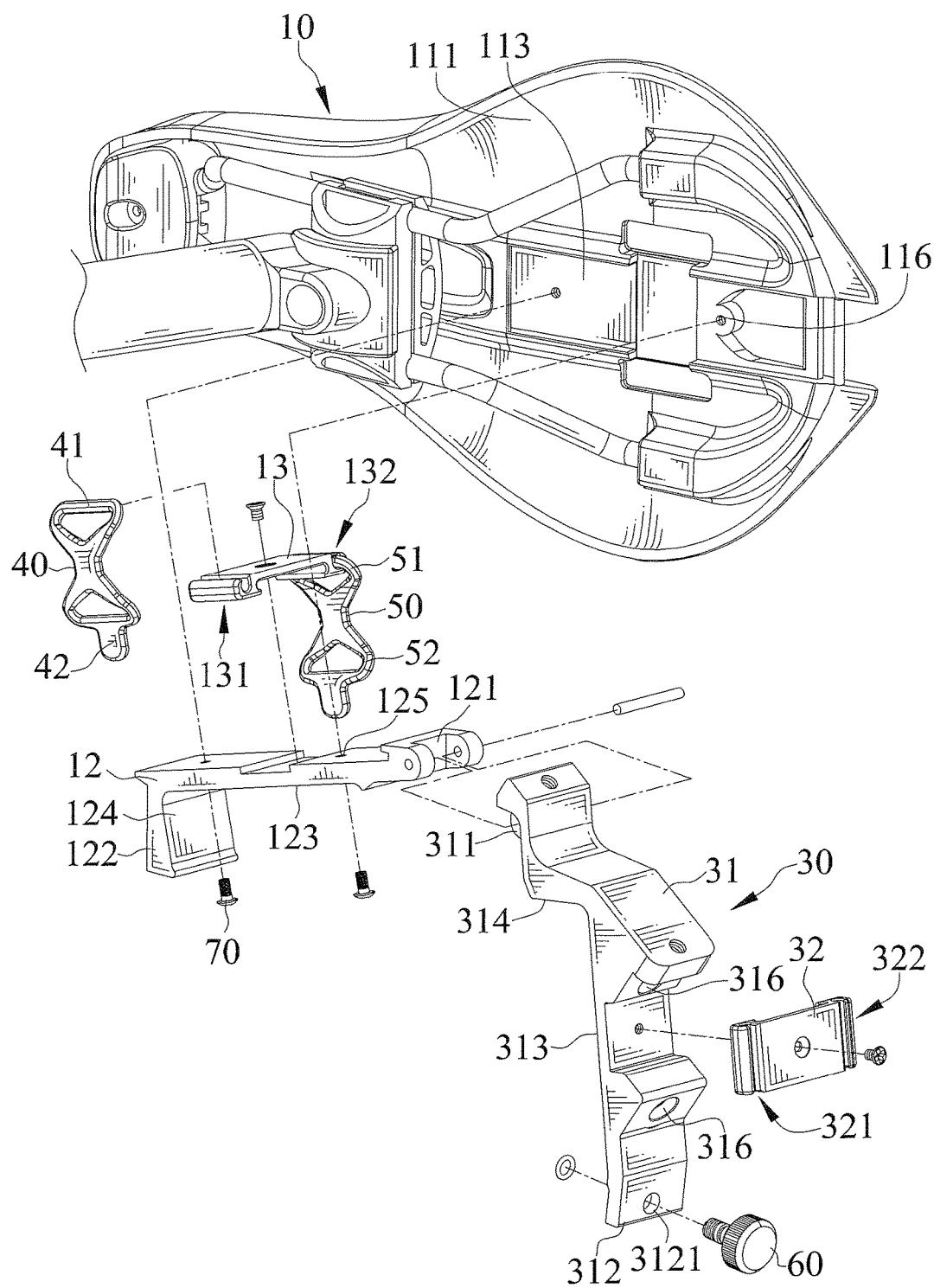
FIG. 2 is a partly-exploded, bottom, perspective view of the bicycle seat of FIG. 1.
Figure 3:
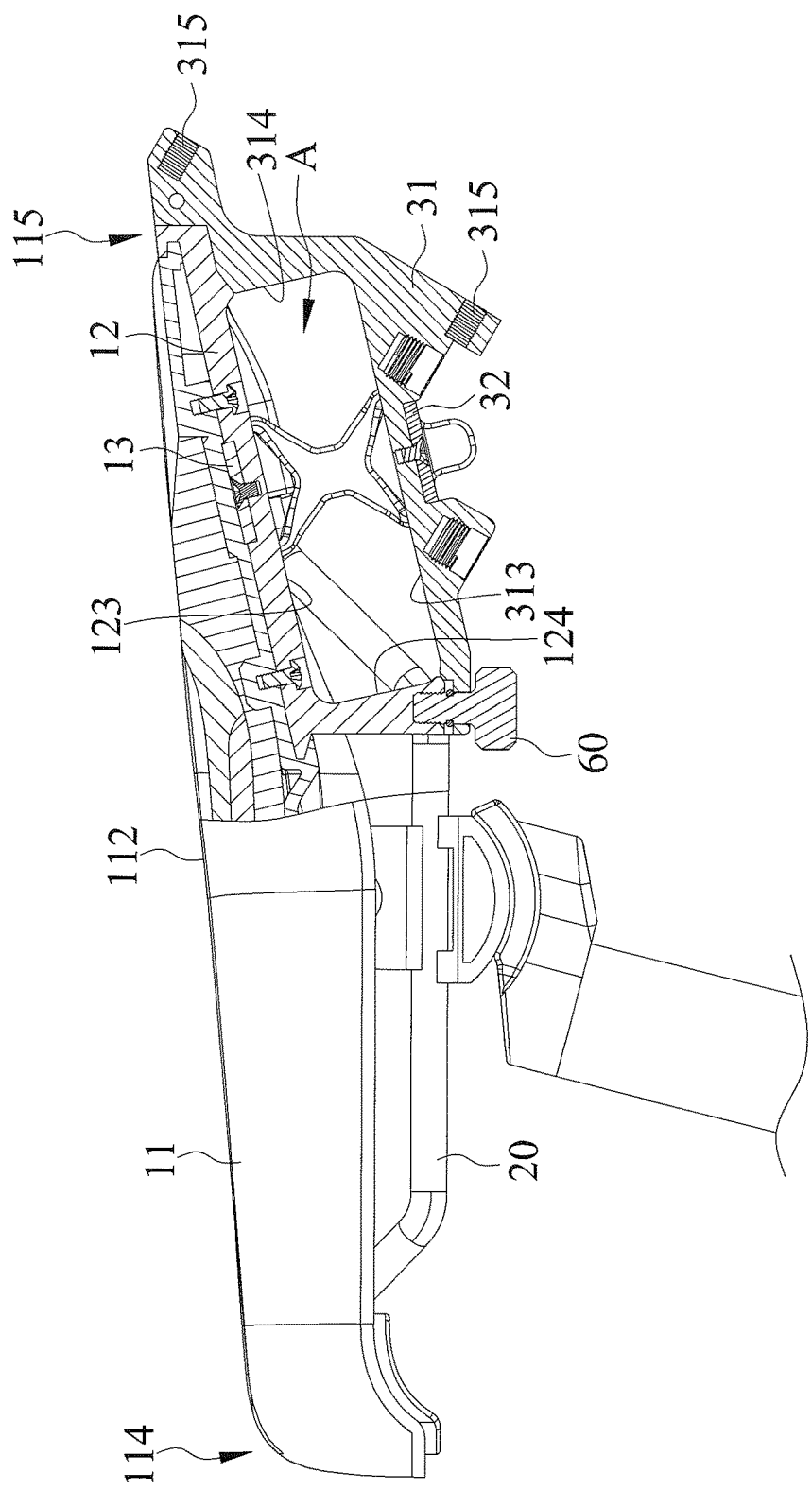
FIG. 3 is a side view, partly cross sectioned, of the bicycle seat of FIG. 1, with the bicycle seat in a first position.

With reference to FIGS. 1-7, a bicycle seat for accommodating bicycle accessories of an embodiment according to the present invention includes a seat 10, two rails 20, a support 30, a first stopper member 40, a second stopper member 50, and a bolt 60. The two rails 20 are connected to the seat 10 and are spaced from each other. The support 30 is pivotably connected to the seat 10 and is located between the two rails 20. The first stopper member 40 is pivotably connected to the seat 10 and is selectively connected to the support 30. The second stopper member 50 is pivotably connected to the seat 10 and is selectively connected to the support 30. The bolt 60 is mounted to the support 30 and can be threadedly engaged with the seat 10.

The seat 10 includes a first body 11, a second body 12, and a third body 13. The first body 11, the second body 12, and the third body 13 are connected to each other. The third body 13 is located between the first body 11 and the second body 12. The second body 12 and the third body 13 are located between the two rails 20. The first body 11 is adapted to be sat upon by a rider.

The first body 11 includes a bottom face 111, a top face 112, a receiving groove 113, a front end 114, a rear end 115, and at least one screw hole 116. The front end 114 and the rear end 115 are respectively located on two opposite ends of the first body 11. The bottom face 111 and the top face 112 are respectively located on two opposite sides of the first body 11 and extend toward the front end 114 and the rear end 115. The two rails 20 are mounted to the bottom face 111. The receiving groove 113 is defined in an end of the bottom face 111 adjacent to the rear end 115 and is located between the two rails 20. The second body 12 and the third body 13 are received in the receiving groove 113. The at least one screw hole 116 is defined in a bottom wall of the receiving groove 113. The top face 112 is to be sat upon by the rider.

The second body 12 includes a first pivotal portion 121, a first engaging portion 122, a first face 123, a second face 124, and at least one through-hole 125. The first pivotal portion 121 and the first engaging portion 122 are respectively disposed on two opposite ends of the second body 12. The first pivotal portion 121 is adjacent to the rear end 115. The first engaging portion 122 is located between the front end 114 and the rear end 115 and includes a screw hole 1221. The second face 124 is adjacent to the first engaging portion 122. The first face 123 is located between the second face 124 and the first pivotal portion 121. The first face 123 and the second face 124 extend perpendicularly to each other. The at least one through-hole 125 extends through the second body 12, is located between the second face 124 and the first pivotal portion 121, and is aligned with the at least one screw hole 116. At least one screw 70 extends through the at least one through-hole 125 and is in threading connection with the at least one screw hole 116. In this embodiment, there are two screw holes 116, two through-holes 125, and two screws 70. Each screw 70 extends through one of the two through-holes 125 and is in threading connection with one of the two screw holes 116. The third body 13 includes a first groove 131 and a second groove 132. The first groove 131 and the second groove 132 are located between the first pivotal portion 121 and the first engaging portion 122 and are located on two opposite sides of the first face 123.

The support 30 includes a fourth body 31 and a fifth body 32. The fourth body 31 is pivotably connected to the second body 12. The fifth body 32 is mounted on an end of the fourth body 31 opposite to the seat 10. The fourth body 31 includes a second pivotal portion 311, a second engaging portion 312, a third face 313, and a fourth face 314. The second pivotal portion 311 and the second engaging portion 312 are respectively located on two opposite ends of the fourth body 31. The second pivotal portion 311 is pivotably connected to the first pivotal portion 121. The second engaging portion 312 is releasably connected to the first engaging portion 122 and includes a through-hole 3121. The bolt 60 extends through the through-hole 3121 and is in threading connection with the screw hole 1221. The fourth face 314 is adjacent to the second pivotal portion 311. The third face 313 is located between the fourth face 314 and the second engaging portion 312. The third face 313 and the fourth face 314 extend perpendicularly to each other. In this embodiment, the fourth body 31 includes two screw holes 315 and two connecting portions 316. The two screw holes 315 are located adjacent to an end of the second pivotal portion 311 opposite to the second engaging portion 312. The two screw holes 315 are configured to couple a water bottle carrier C to the support 30. The two connecting portions 316 are located between the second pivotal portion 311 and the second engaging portion 312 and are located on a side of the support 30 opposite to the third face 313. An inflation gas container D is adapted to be connected to one of the two connecting portions 316. An inflation valve coupler E is adapted to be connected to the other of the two connecting portions 316. The fifth body 32 includes a third groove 321 and a fourth groove 322. The third groove 321 and the fourth groove 322 are located between the second pivotal portion 311 and the second engaging portion 312 and are located on two opposite sides of the third face 313.

The first stopper member 40 is elastically deformable and includes a first buckle portion 41 and a second buckle portion 42. The first buckle portion 41 and the second buckle portion 42 are respectively located on two opposite ends of the first stopper member 40. The first buckle portion 41 is received in the first groove 131. The second buckle portion 42 is removably received in the third groove 321. The second stopper member 50 is elastically deformable and includes a third buckle portion 51 and a fourth buckle portion 52. The third buckle portion 51 and the fourth buckle portion 52 are respectively located on two opposite ends of the second stopper member 50. The third buckle portion 51 is received in the second groove 132. The fourth buckle portion 52 is removably received in the fourth groove 322.

Figure 4:
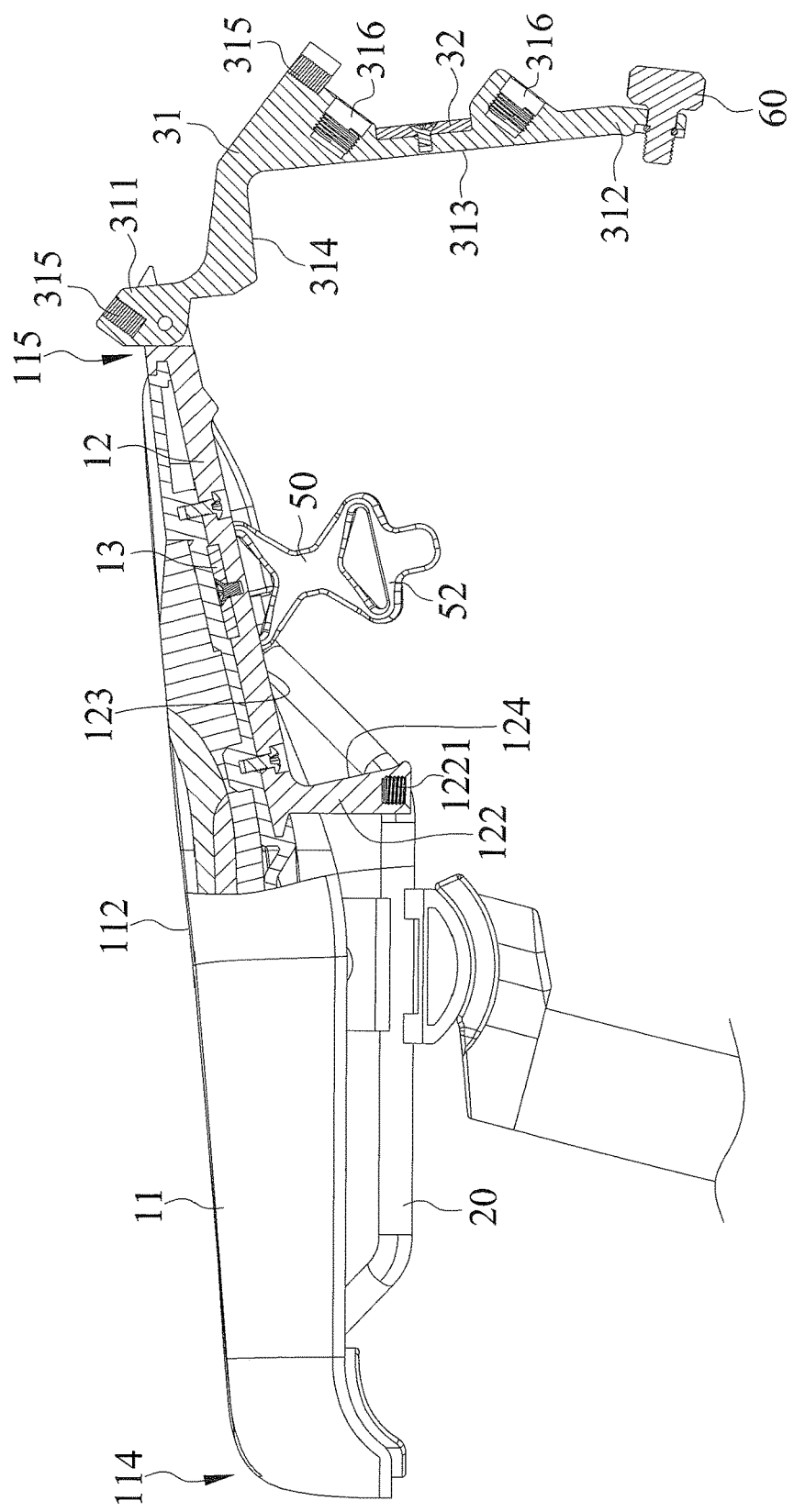
FIG. 4 is a view similar to FIG. 3, with the bicycle seat in a second position.
Figure 5:
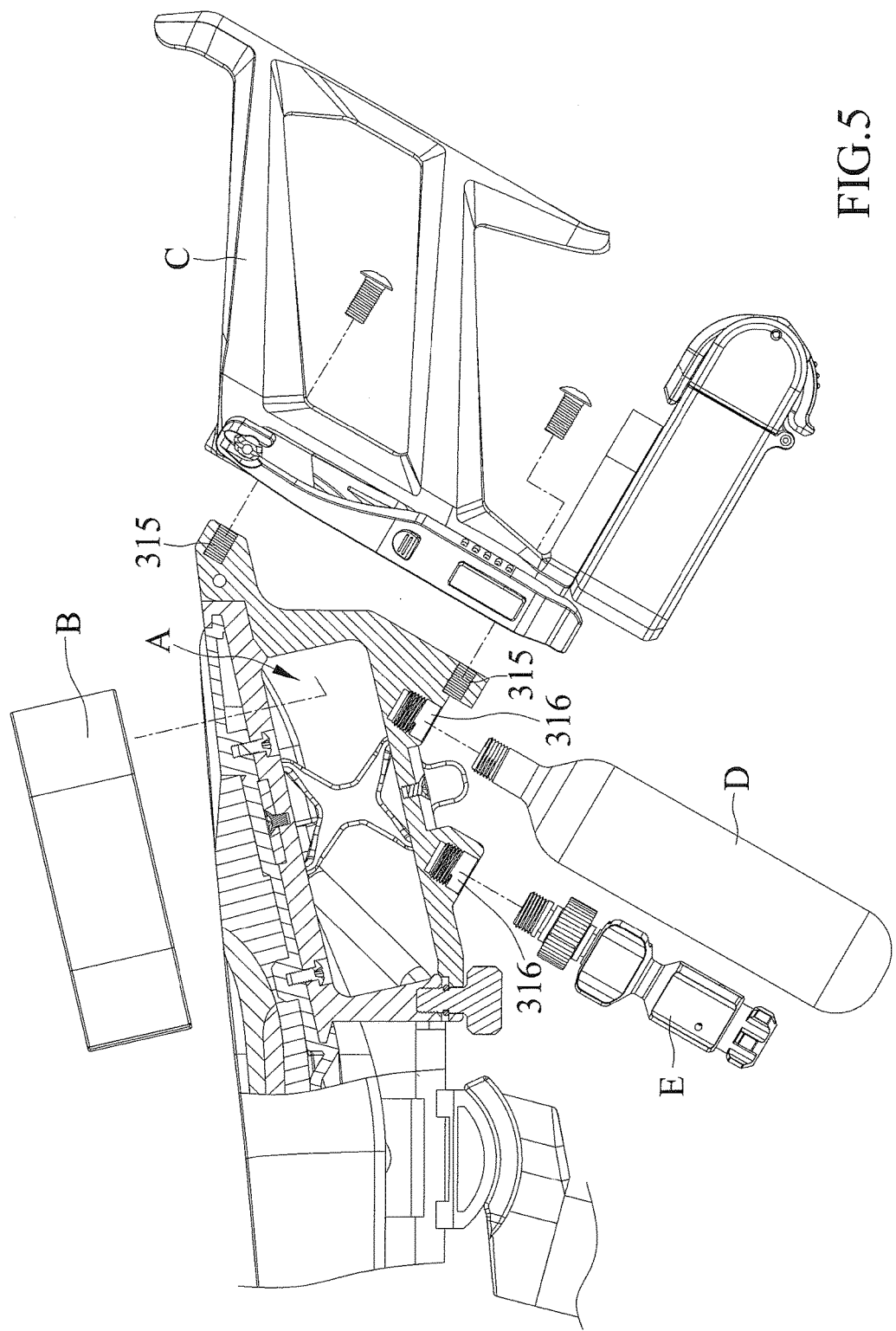
FIG. 5 is a view similar to FIG. 3, with bicycle accessories attached to the bicycle seat.
Figure 6:
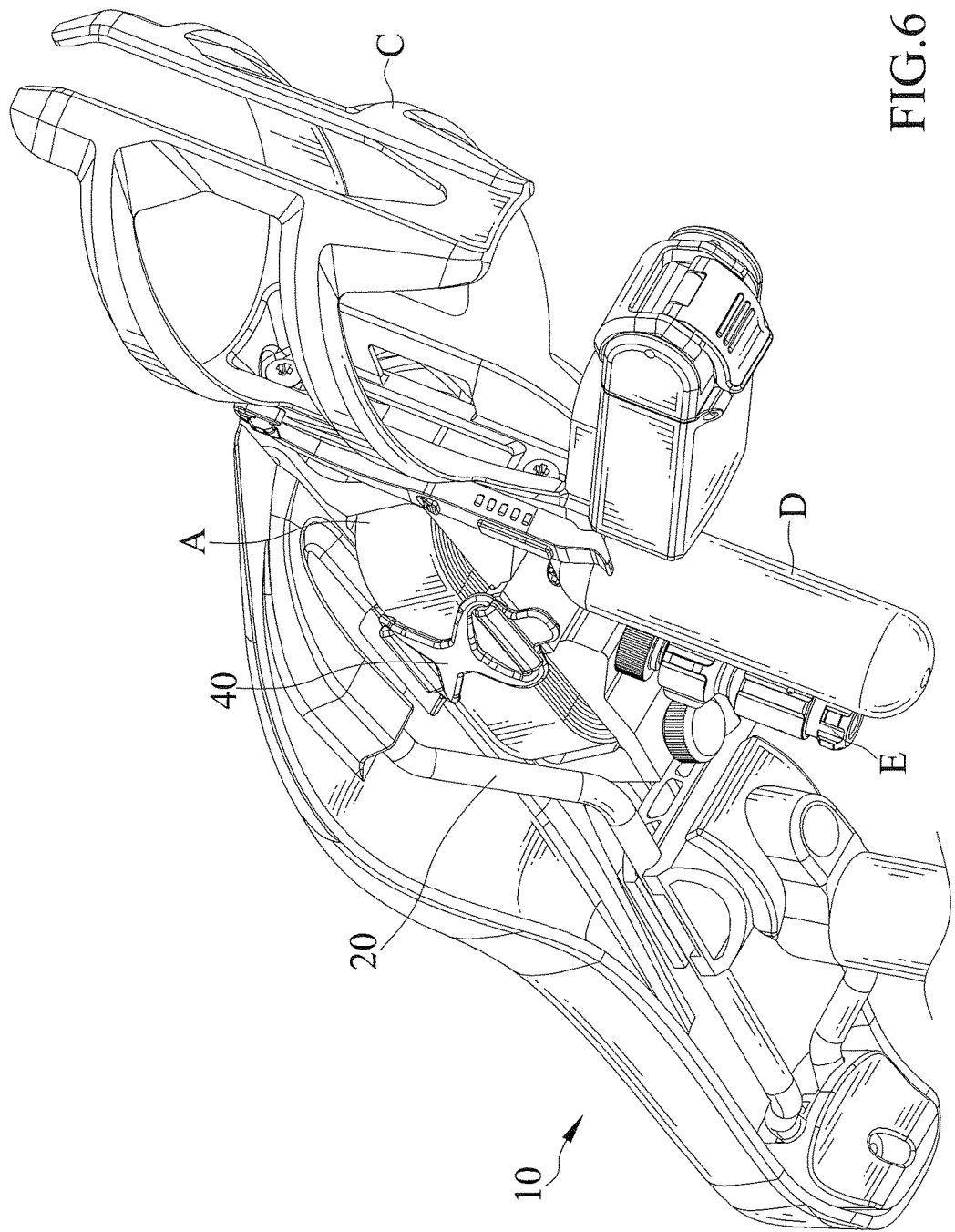
FIG. 6 is a bottom, perspective view of the bicycle seat of FIG. 5.
Figure 7:
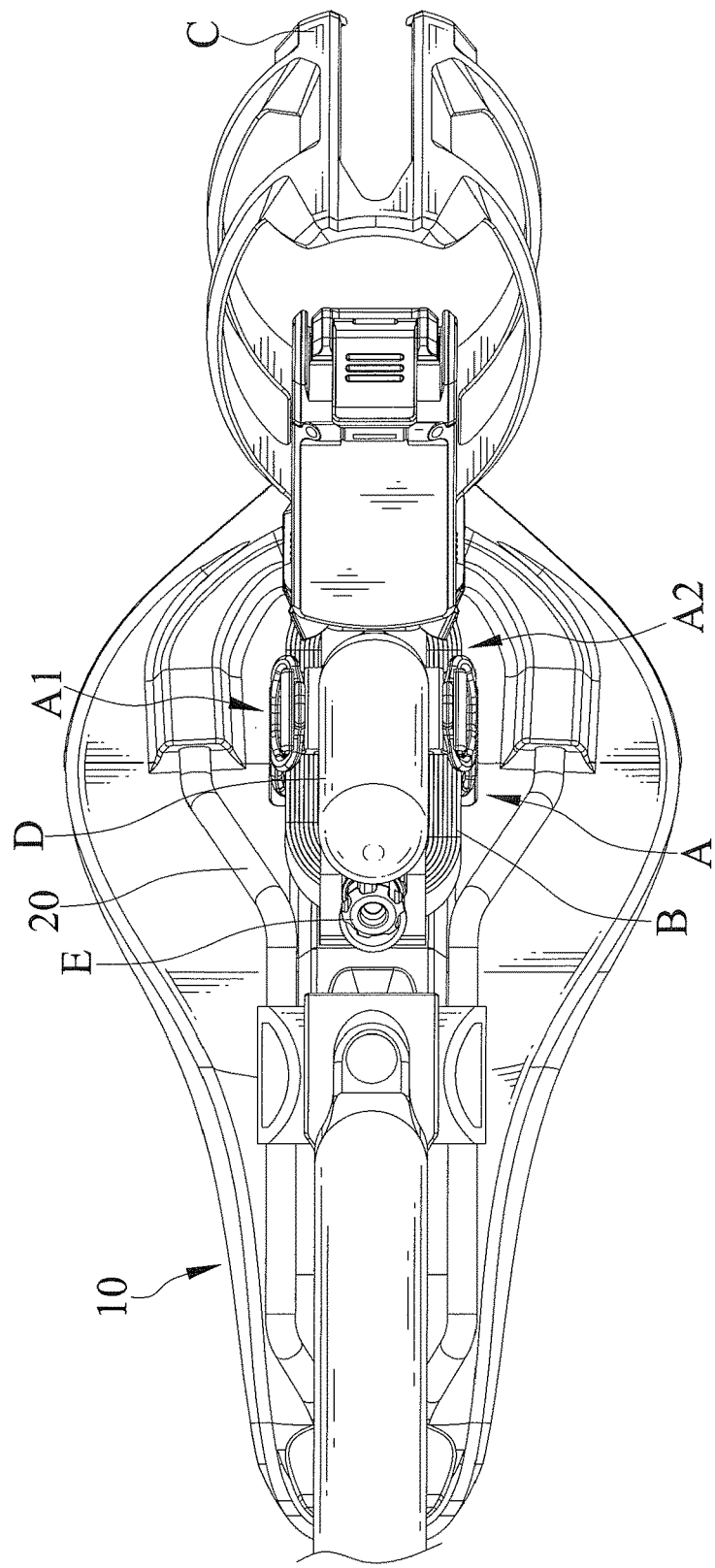
FIG. 7 is a bottom view of the bicycle seat of FIG. 6.

The bicycle seat is switchable between a first position (FIG. 3) and a second position (FIG. 4). When the bicycle seat is in the first position, the second engaging portion 312 is connected to the first engaging portion 122. Furthermore, the bolt 60 is threadedly engaged in the screw hole 1221. Thus, a receiving space A is defined between the support 30 and the seat 10. The first face 123, the second face 124, the third face 313, and the fourth face 314 together define a periphery of the receiving space A for accommodating at least one bicycle accessory. The receiving space A includes a first opening A1 and a second opening A2. The first opening A1 and the second opening A2 are respectively located on two opposite sides of the receiving space A. The first stopper member 40 is pivotably connected to a side of the seat 10 adjacent to the first opening A1 and is selectively connected to the support 30 to open or close the first opening A1. The second stopper member 50 is pivotably connected to the other side of the seat 10 adjacent to the second opening A2 and is selectively connected to the support 30 to open or close the second opening A2.

In a case that the second buckle portion 42 of the first stopper member 40 disengages from the third groove 321 of the fifth body 32 to open the first opening A1 and that the fourth buckle portion 52 of the second stopper member 50 disengages from the fourth groove 322 of the fifth body 32 to open the second opening A2, the bicycle accessories can be placed into the receiving space A.

Then, the second buckle portion 42 of the first stopper member 40 can be engaged with the third groove 321 of the fifth body 32 to close the first opening A1, and the fourth buckle portion 52 of the second stopper member 50 can be engaged with the fourth groove 322 of the fifth body 32 to close the second opening A2, such that the bicycle accessories cannot be removed from the receiving space A.

When the bicycle seat is in the second position, the bolt 60 disengages from the screw hole 1221 of the first engaging portion 122, the second buckle portion 42 of the first stopper member 40 disengages from the third groove 321 of the fifth body 32, and the fourth buckle portion 52 of the second stopper member 50 disengages from the fourth groove 322 of the fifth body 32. In this embodiment, an inner tire B can be placed into the receiving space A.

In view of the foregoing, the bicycle seat according to the present invention includes several advantages. Firstly, the support 30 is connected to the seat 10 and is located between the two rails 20, and the receiving space A is formed between the support 30 and the seat 10. The space between the two rails 20 can be effectively utilized, and the receiving space A can accommodate bicycle accessories. Thus, the user does not have to prepare a bicycle bag, which is convenient.

Secondly, the inflation gas container D and the inflation valve coupler E can be respectively connected to the two connecting portions 316, and the receiving space A can receive a spare inner tire. Thus, when the inner tire of the bicycle is broken during cycling, the spare inner tire received in the receiving space A can be immediately used and inflated to provide convenience.

Thirdly, the two screw holes 315 of the fourth body 31 can be used to couple a water bottle carrier C to the seat 10 at a location adjacent to the rear end 115, which is suitable for a road bicycle or a triathlon bicycle.

Although specific embodiments have been illustrated and described, numerous modifications and variations are still possible without departing from the scope of the invention. The scope of the invention is limited by the accompanying claims.

The invention claimed is:

1. A bicycle seat for accommodating bicycle accessories, comprising:
    a seat including a bottom face, wherein the seat includes a first pivotal portion and a first engaging portion, wherein the first pivotal portion and the first engaging portion are located adjacent to the bottom face;
    two rails fixed below and spaced from the bottom face of the seat; and
    a support connected to the seat and located between the two rails, wherein a receiving space is defined between the support and the seat, wherein the receiving space is adapted to accommodate at least one bicycle accessory, wherein the support includes a second pivotal portion and a second engaging portion, wherein the second pivotal portion is pivotably connected to the first pivotal portion, wherein the second engaging portion is releasably connected to the first engaging portion, and wherein the support and the seat together define the receiving space when the second engaging portion is connected to the first engaging portion.

2. The bicycle seat for accommodating bicycle accessories as claimed in claim 1, wherein the seat includes a first face and a second face, wherein the first face and the second face extend perpendicularly to each other and are located between the first pivotal portion and the first engaging portion, wherein the support includes a third face and a fourth face, wherein the third face and the fourth face extend perpendicularly to each other and are located between the second pivotal portion and the second engaging portion, wherein the first face, the second face, the third face, and the fourth face together define a periphery of the receiving space when the second engaging portion is connected to the first engaging portion.

3. The bicycle seat for accommodating bicycle accessories as claimed in claim 2, wherein the first engaging portion includes a screw hole, wherein the second engaging portion includes a through-hole, and wherein a bolt extends through the through-hole and is in threading connection with the screw hole.

4. The bicycle seat for accommodating bicycle accessories as claimed in claim 1, wherein the receiving space includes a first opening and a second opening, wherein the first opening and the second opening are respectively located on two opposite sides of the receiving space, wherein a first stopper member is pivotably connected to a side of the seat adjacent to the first opening and is selectively connected to the support to open or close the first opening, and wherein a second stopper member is pivotably connected to another side of the seat adjacent to the second opening and is selectively connected to the support to open or close the second opening.

5. The bicycle seat for accommodating bicycle accessories as claimed in claim 4, wherein the seat includes a first groove and a second groove, wherein the first groove and the second groove are located between the first pivotal portion and the first engaging portion, wherein the support includes a third groove and a fourth groove, wherein the third groove and the fourth groove are located between the second pivotal portion and the second engaging portion and are located adjacent to the bottom face, wherein the first stopper member is elastically deformable and includes a first buckle portion and a second buckle portion, wherein the first buckle portion and the second buckle portion are respectively located on two opposite ends of the first stopper member, wherein the first buckle portion is received in the first groove, wherein the second buckle portion is removably received in the third groove, wherein the second stopper member is elastically deformable and includes a third buckle portion and a fourth buckle portion, wherein the third buckle portion and the fourth buckle portion are respectively located on two opposite ends of the second stopper member, wherein the third buckle portion is received in the second groove, and wherein the fourth buckle portion is removably received in the fourth groove.

6. The bicycle seat for accommodating bicycle accessories as claimed in claim 5, wherein the seat includes a first body, a second body, and a third body, wherein the first body includes the bottom face, a top face, and a receiving groove, wherein the top face is located on a side of the first body opposite to the first face and is adapted to be sat upon by a user, wherein the receiving groove is defined in the bottom face and is located between the two rails, wherein the second body and the third body are received in the receiving groove, wherein the third body is located between the first body and the second body, wherein the second body includes the first pivotal portion and the first engaging portion, wherein the third body includes the first groove and the second groove, wherein the first groove and the second groove are respectively located on two opposite sides of the second body, wherein the support includes a fourth body and a fifth body, wherein the fourth body includes the second pivotal portion and the second engaging portion, wherein the fifth body is mounted on an end of the fourth body opposite to the seat and includes the third groove and the fourth groove, and wherein the third groove and the fourth groove are respectively located on two opposite sides of the fourth body.

7. The bicycle seat for accommodating bicycle accessories as claimed in claim 6, wherein the first body includes at least one screw hole in a bottom wall of the receiving groove, wherein the second body includes at least one through-hole extending through the second body, and wherein at least one screw extends through the at least one through-hole and is in threading connection with the at least one screw hole.

8. The bicycle seat for accommodating bicycle accessories as claimed in claim 6, wherein the first body includes a front end and a rear end, wherein the front end and the rear end are respectively located on two opposite ends of the first body, wherein the receiving groove is disposed at an end of the first body adjacent to the rear end, wherein the first pivotal portion of the second body is located adjacent to the rear end of the first body, and wherein the first engaging portion of the second body is located between the front end and the rear end.

9. The bicycle seat for accommodating bicycle accessories as claimed in claim 1, wherein the support includes two screw holes and two connecting portions, wherein the two screw holes are located adjacent to an end of the second pivotal portion opposite to the second engaging portion, wherein the two screw holes are configured to couple a water bottle carrier to the support, wherein the two connecting portions are located between the second pivotal portion and the second engaging portion and are located on a side of the support remote to the seat, wherein an inflation gas container is adapted to be connected to one of the two connecting portions, and wherein an inflation valve coupler is adapted to be connected to another of the two connecting portions.

* * * * *